(12) United States Patent  
Kang

(10) Patent No.: US 8,656,144 B2  
(45) Date of Patent: Feb. 18, 2014

(54) IMAGE PROCESSING DEVICE, IMAGE PROCESSING METHOD, AND IMAGE PROCESSING PROGRAM

(75) Inventor: Woobum Kang, Osaka (JP)

(73) Assignee: Keyence Corporation, Osaka (JP)

( * ) Notice: Subject to any disclaimer, the term of this patent is extended or adjusted under 35 U.S.C. 154(b) by 12 days.

(21) Appl. No.: 13/267,219

(22) Filed: Oct. 6, 2011

(65) Prior Publication Data

US 2012/0105717 A1     May 3, 2012

(30) Foreign Application Priority Data

Oct. 29, 2010 (JP) ................................. 2010-244703

(51) Int. Cl.  
     *G06F 9/44*            (2006.01)

(52) U.S. Cl.  
     USPC ........... 712/236; 712/216; 712/225; 712/229; 703/2; 386/226; 386/228; 386/230; 386/232; 348/441

(58) Field of Classification Search  
     USPC ....................... 703/2; 386/226, 228, 230, 232; 712/236, 229, 216, 225  
See application file for complete search history.

(56) References Cited

U.S. PATENT DOCUMENTS

| | | | |
|---|---|---|---|
| 7,421,092 B2 * | 9/2008 | Clarkson et al. | 382/103 |
| 2007/0179761 A1 * | 8/2007 | Wren et al. | 703/2 |
| 2009/0002485 A1 | 1/2009 | Fujiwara | |
| 2009/0102938 A1 | 4/2009 | Takahashi et al. | |
| 2009/0189994 A1 | 7/2009 | Shimonaka | |
| 2010/0318478 A1 * | 12/2010 | Yoshiike et al. | 706/12 |
| 2011/0043688 A1 * | 2/2011 | Wang | 348/448 |
| 2012/0105664 A1 * | 5/2012 | Kang | 348/222.1 |
| 2012/0105722 A1 * | 5/2012 | Kang et al. | 348/563 |
| 2012/0144167 A1 * | 6/2012 | Yates et al. | 712/216 |

FOREIGN PATENT DOCUMENTS

| | | |
|---|---|---|
| JP | 2009-008918 | 1/2009 |
| JP | 2009-017481 | 1/2009 |
| JP | 2009-100326 | 5/2009 |
| JP | 2009-141709 | 6/2009 |
| JP | 2009-141710 | 6/2009 |
| JP | 2009-177537 | 8/2009 |

* cited by examiner

*Primary Examiner* — Helen Shibru  
(74) *Attorney, Agent, or Firm* — Kilyk & Bowersox, P.L.L.C.

(57) ABSTRACT

The invention provides an image processing device, an image processing method, and an image processing program which enable accurately observing a moving image of an object within a time interval within which the object is in a desired state. A control unit performs an analysis process after the elapse of every defined time period. As the analysis process, the control unit acquires evaluation values corresponding to image data of a plurality of frames stored within a latest defined time period and, based on the acquired evaluation values, selects a group of reproduction data formed from image data of a certain number of frames, out of the image data of the plurality of frames stored within the latest defined time period. After the completion of the analysis process, the control unit starts reproduction of a moving image based on the group of reproduction data selected through the analysis process.

6 Claims, 10 Drawing Sheets

IMAGE PROCESSING DEVICE, IMAGE PROCESSING METHOD, AND IMAGE PROCESSING PROGRAM

CROSS-REFERENCE TO RELATED APPLICATIONS

The present application claims foreign priority based on Japanese Patent Application No. 2010-244703, filed Oct. 29, 2010, the contents of which is incorporated herein by reference.

BACKGROUND OF THE INVENTION

1. Field of the Invention

The present invention relates to an image processing device, an image processing method, and an image processing program.

2. Description of Related Art

In laboratories, manufacturing sites, and the like, there have been employed high-speed image-pickup devices capable of picking up images of subjects at higher frame rates, in order to analyze movements of various types of subjects (works, devices, and the like). When an image of a subject is picked up by a camera, a plurality of pieces of image data corresponding to a plurality of images are successively acquired, and the acquired plurality of pieces of image data are stored as moving-image data in a storage unit. Based on the image data stored in the storage unit, images of a plurality of frames are displayed as a moving image of the subject, on a display unit such as a liquid crystal display panel. Using such a moving image, the movements of the subject are analyzed.

During image pickup, it is necessary to adjust image-pickup conditions including a shutter speed. A user adjusts the image-pickup conditions by checking a moving image being displayed on a display unit. In cases of higher frame rates for image pickup, it is hard to display captured image data at the same frame rate as that of image pickup. This causes the captured image data to be displayed at a lower frame rate than that of image pickup.

Japanese Unexamined Patent Publication No. 2009-100326 describes a high-speed image pickup device which, after completion of high-speed image recording for a predetermined number of frame images at the time of picking up an image of a subject, slowly reproduces the recorded frame images at a lower frame rate than that of image pickup. After the completion of the slow reproduction of the frame images, high-speed image recording is started, again. Thereafter, similarly, high-speed image recording and slow reproduction are alternately repeated.

For example, when a work being transferred by a belt conveyer is a subject, there is a time interval within which the subject exists in the area to be subjected to image pickup by a camera (hereinafter, referred to as "image-pickup area"), but there is also a time interval within which the subject does not exist therein.

With the high-speed image pickup device in Japanese Unexamined Patent Publication No. 2009-100326, high-speed image recording and slow reproduction of frame images are alternately repeated at constant time intervals. This enables accurately observing movements of the subject. However, when a work on a belt conveyer is a subject as described above, frame images picked up within the time interval within which the subject exists in the image-pickup area may not be recorded, but frame images picked up within the time interval within which the subject does not exist in the image-pickup area may be recorded. This makes it impossible to observe a moving image of the subject.

SUMMARY OF THE INVENTION

The present invention aims to provide an image processing device, an image processing method, and an image processing program which enable accurately observing a moving image of an object within a time interval within which the object is in a desired state.

(1) An image processing device according to one embodiment of the present invention is an image processing device for displaying a moving image of an object, including: a storage unit adapted to successively store, at a first frame rate, image data corresponding to images of a plurality of frames which forms a moving image of the object, within a continuous plurality of first time intervals; a display unit adapted to display images based on the image data of the plurality of frames stored in the storage unit; an acquisition unit adapted to acquire a plurality of evaluation values which correspond to the image data of the plurality of frames stored in the storage unit and are varied according to a state of the object; a selection unit adapted to, based on a plurality of evaluation values corresponding to image data of a first number of frames stored in the storage unit within each first time interval out of the plurality of evaluation values acquired by the acquisition unit, select a group of image data formed from image data of a second number of frames which is less than the first number of frames, out of the image data of the first number of frames; and a control unit adapted to successively display, on the display unit, at a second frame rate lower than the first frame rate, images of the second number of frames based on the image data in the group of image data selected by the selection unit.

With the aforementioned image processing device, image data corresponding to images of a plurality of frames are successively stored, in the storage unit, at the first frame rate, within a continuous plurality of first time intervals. A plurality of evaluation values which are varied according to the state of the object are acquired by the acquisition unit. The plurality of evaluation values correspond to the stored image data of the plurality of frames. Based on a plurality of evaluation values corresponding to image data of a first number of frames stored within each first time interval out of the acquired plurality of evaluation values, the selection unit selects a group of image data formed from image data of a second number of frames which is less than the first number of frames, out of the image data of the first number of frames. Based on the image data in the selected group of image data, images of the second number of frames are successively displayed, on the display unit, at the second frame rate lower than the first frame rate.

As described above, based on the group of image data selected based on the evaluation values, out of the stored image data of the first number of frames, images of the second number of frames are displayed on the display unit at the second frame rate lower than the first frame rate for storage. Thus, some desired images out of the images of the plurality of frames are slowly reproduced, as a moving image. This enables selecting a group of image data according to the state of the object. Accordingly, it is possible to accurately observe the moving image of the object within a time interval within which the object was in a desired state.

(2) The selection unit may be adapted to select, as the group of image data, image data of a second number of continuous frames, by using, as a reference, the image data corresponding to an evaluation value indicating a predetermined characteristic, out of the image data of the first number of frames.

In this case, a group of image data corresponding to desired images can be properly selected, according to the state of the object. Further, based on the selected group of image data, a continuous and natural moving image can be slowly reproduced. Accordingly, it is possible to accurately observe the moving image of the object within a time interval within which the object is in a desired state.

(3) The second frame rate and the second number of frames are determined, such that the images of the second number of frames based on the group of image data selected out of the image data of the first number of frames are displayed on the display unit within a second time interval equal to each first time interval.

In this case, the time period within which the images of the first number of frames are stored is equal to the time period within which the images based on the selected group of image data are displayed. This enables performing, in parallel, storage of image data within a plurality of first time intervals and displaying of images based on a plurality of groups of image data. Accordingly, it is possible to effectively observe moving images of the object within time intervals within which the object is in a desired state.

(4) The selection unit may be adapted to perform an operation for selecting a group of image data out of the image data of the first number of frames stored within each first time interval, within the first time interval subsequent to each first time interval.

In this case, immediately after the image data of the first number of frames are stored within each first time interval, a group of image data is selected out of the image data of the first number of frames, and images of the second number of frames based on the selected group of image data are successively displayed on the display unit. This enables performing, in parallel, storage of image data within a plurality of first time intervals and displaying of images based on a plurality of groups of image data. Accordingly, it is possible to effectively observe moving images of the object within time intervals within which the object is in a desired state.

(5) The plurality of evaluation values are values indicating characteristics of the images of the plurality of frames.

In this case, it is possible to properly select a group of image data corresponding to a desired state of the object. Further, it is not necessary to provide another detection device or the like, which enables simplification of the structure of the image processing device.

(6) The values indicating characteristics of the images of the plurality of frames are values relating to luminances of the images of the plurality of frames.

In this case, the luminances of the images of the plurality of frames are varied according to the state of the object. Accordingly, it is possible to easily and properly select a group of image data corresponding to a desired state of the object, based on the values relating to the luminances of the images of the plurality of frames.

(7) The plurality of evaluation values are values of outputs from a detection device for detecting a value which is varied with the change of the state of the object.

In this case, the value of the output of the detection device is varied according to the state of the object. Accordingly, it is possible to easily and properly select a group of image data corresponding to a desired state of the object, based on the values of outputs from the detection device.

(8) The plurality of evaluation values are values indicating degrees of similarity between the images of the respective frames and a predetermined reference image.

In this case, the degrees of similarity between the images of the respective frames and a reference image are varied, according to the state of the object. Accordingly, it is possible to easily and properly select a group of image data corresponding to a desired state of the object, based on the values indicating the degrees of similarity therebetween.

(9) An image processing method according to another embodiment of the present invention is an image processing method for displaying a moving image of an object, including the steps of: successively storing, at a first frame rate, image data corresponding to images of a plurality of frames which forms a moving image of the object, within a continuous plurality of first time intervals; acquiring a plurality of evaluation values which correspond to the stored image data of the plurality of frames and are varied according to a state of the object; selecting, based on a plurality of evaluation values corresponding to image data of a first number of frames stored within each first time interval out of the acquired plurality of evaluation values, a group of image data formed from image data of a second number of frames which is less than the first number of frames, out of the image data of the first number of frames; and displaying, on a display unit, at a second frame rate lower than the first frame rate, images of the second number of frames based on the image data in the selected group of image data.

With the aforementioned image processing method, image data corresponding to images of a plurality of frames are successively stored, at the first frame rate, within a continuous plurality of first time intervals. A plurality of evaluation values which are varied according to the state of the object are acquired. The plurality of evaluation values correspond to the stored image data of the plurality of frames. Based on the plurality of evaluation values corresponding to image data of a first number of frames stored within each first time interval out of the acquired plurality of evaluation values, a group of image data formed from image data of a second number of frames which is less than the first number of frames is selected, out of the image data of the first number of frames. Based on the image data in the selected group of image data, images of the second number of frames are successively displayed, on the display unit, at the second frame rate lower than the first frame rate.

As described above, based on the group of image data selected based on the evaluation values, out of the stored image data of the first number of frames, images of the second number of frames are displayed on the display unit at the second frame rate lower than the first frame rate for storage. Thus, some desired images out of the images of the plurality of frames are slowly reproduced, as a moving image. This enables selecting a group of image data according to the state of the object. Accordingly, it is possible to accurately observe the moving image of the object within a time interval within which the object is in a desired state.

(10) An image processing program according to yet another embodiment is an image processing program which is executed by a processing device to display a moving image of an object, the image processing program for causing the processing device to execute the processes of: successively storing, at a first frame rate, image data corresponding to images of a plurality of frames which forms a moving image of the object, within a continuous plurality of first time intervals; acquiring a plurality of evaluation values which correspond to the stored image data of the plurality of frames and are varied according to a state of the object; selecting, based on a plurality of evaluation values corresponding to image data of a first number of frames stored within each first time interval out of the acquired plurality of evaluation values, a group of image data formed from image data of a second number of frames which is less than the first number of frames, out of the image data of the first number of frames; and displaying, on a display unit, at a second frame rate lower than the first frame rate, images of the second number of frames based on the image data in the selected group of image data.

With the aforementioned image processing program, image data corresponding to images of a plurality of frames are successively stored, at the first frame rate, within a continuous plurality of first time intervals. A plurality of evaluation values which are varied according to the state of the object are acquired. The plurality of evaluation values correspond to the stored image data of the plurality of frames. Based on a plurality of evaluation values corresponding to image data of a first number of frames stored within each first time interval out of the acquired plurality of evaluation values, a group of image data formed from image data of a second number of frames which is less than the first number of frames is selected, out of the image data of the first number of frames. Based on the image data in the selected group of image data, images of the second number of frames are successively displayed, on the display unit, at the second frame rate lower than the first frame rate.

As described above, based on the group of image data selected based on the evaluation values, out of the stored image data of the first number of frames, images of the second number of frames are displayed on the display unit at the second frame rate lower than the first frame rate for storage. Thus, some desired images out of the images of the plurality of frames are slowly reproduced, as a moving image. This enables selecting a group of image data according to the state of the object. Accordingly, it is possible to accurately observe the moving image of the object within a time interval within which the object is in a desired state.

According to the present invention, it is possible to accurately observe a moving image of an object within a time interval within which the object is in a desired state.

DETAILED DESCRIPTION OF PREFERRED EMBODIMENTS

Hereinafter, there will be described an image processing device, an image processing method, and an image processing program according to an embodiment of the present invention, with reference to the drawings. As will be described later, an image processing system according to the present embodiment includes a display unit. The display unit is adapted to continuously display images of a plurality of frames for displaying moving images.

(1) Basic Structure of Image Processing System

Figure 1:
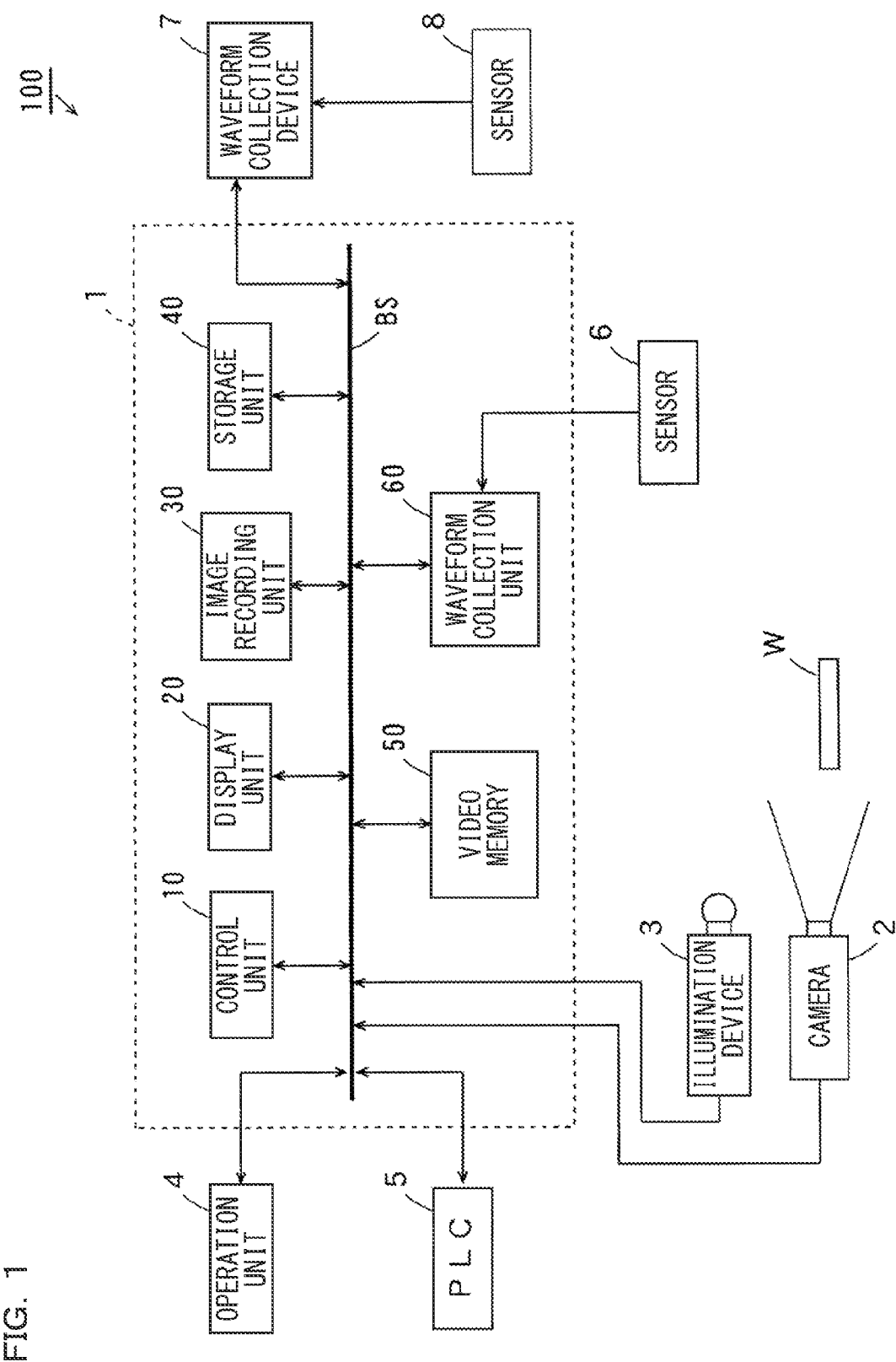
FIG. 1 is a block diagram illustrating a structure of an image processing system according to an embodiment of the present invention.

FIG. 1 is a block diagram illustrating a structure of an image processing system 100 according to an embodiment of the present invention. As illustrated in FIG. 1, the image processing system 100 includes an image processing device 1, a camera 2, an illumination device 3, and an operation unit 4. The image processing device 1 includes a control unit 10, a display unit 20, an image recording unit 30, a storage unit 40, a video memory 50, a waveform collection unit 60, a bus BS, and a plurality of interfaces (not illustrated). The control unit 10, the display unit 20, the image recording unit 30, the storage unit 40, the video memory 50, and the waveform collection unit 60 are connected to the bus BS. The camera 2, the illumination device 3, and the operation unit 4 are connected to the bus BS through respective interfaces.

A PLC (Programmable Logic Controller) 5, a sensor 6, and a waveform collection device 7 can be connected to the image processing device 1. A sensor 8 can be connected to the waveform collection device 7. The details thereof will be described later.

The camera 2 includes an image pickup device, such as a CCD (charge-coupled device) image sensor or a CMOS (complementary metal oxide semiconductor) image sensor. A user can set the light-exposure time (shutter speed), the image-pickup frame rate, and the like of the image pickup device, using the operation unit 4. The image-pickup frame rate refers to the number of frames of images to be captured per unit time. Further, in the present embodiment, the camera 2 is capable of picking up images of a subject W at image-pickup frame rates in the range of not less than 15 fps (frame per second) and not more than 32000 fps. The subject W is a work being transferred by a belt conveyer, for example.

If image-pickup is performed on the subject W by the camera 2, the image pickup device captures images of the subject W at the set image-pickup frame rate, and then, the captured images are outputted as image data. Thus, image data of a plurality of frames corresponding to images of the plurality of frames are supplied from the camera 2 to the image processing device 1. A moving image is formed from the images of the plurality of frames. Hereinafter, image data of a plurality of frames will be referred to as moving-image data.

The camera 2 is mounted on a supporting table (not shown) such as a tripod together with the illumination device 3. The illumination device 3 includes a light source, such as a metal halide lamp or a high power LED (light-emitting diode). The illumination device 3 is used for irradiating the subject W with light. When the subject W has sufficient brightness, the illumination device 3 is not necessary.

The video memory 50 is constituted by a memory, such as a RAM (Random Access Memory). The video memory 50 is successively supplied with image data of a plurality of frames from the camera 2, the image recording unit 30, or the storage unit 40. Such supplied image data of a plurality of frames are successively stored in the video memory 50.

The display unit 20 is constituted by, for example, a liquid crystal display panel or an organic EL (electroluminescence) panel. The display unit 20 is caused to sequentially display, thereon, images of a plurality of frames, based on image data of a plurality of frames having been successively stored in the video memory 50. This causes the display unit 20 to display moving images thereon.

The operation unit 4 is constituted by a pointing device, such as a mouse or a trackball. The operation unit 4 may be constituted by a key board, a remote controller, or a touch panel, together with the pointing device or in place of the pointing device. The operation unit 4 may also be formed integrally with the image processing device 1.

The image recording unit 30 is constituted by a memory, such as a RAM. The image recording unit 30 includes a moving-image data storage area for storing moving-image data formed from image data of a plurality of frames, and a waveform-data storage area for storing waveform data formed from a plurality of evaluation values. Such waveform data formed from a plurality of evaluation values will be described later, in detail.

Storing image data of a plurality of frames (moving-image data) supplied from the camera 2 into the moving-image data storage area in the image recording unit 30 is referred to as "image recording". The user can perform image recording of moving images of the subject W picked up by the camera 2, by operating the operation unit 4. In the present embodiment, during image recording processes, a plurality of evaluation values (waveform data) supplied from the waveform collection unit 60 are stored in the waveform-data storage area in the image recording unit 30, at the same time.

The storage unit 40 is constituted by a large-capacity storage device, such as a hard disk. The user can create a moving-image file containing moving-image data and waveform data stored in the image recording unit 30 and can store the created moving-image file in the storage unit 40, by operating the operation unit 4. Further, an image processing program according to the present embodiment is stored in the storage unit 40. The image processing program will be described later in detail.

The waveform collection unit 60 collects waveform data formed from a plurality of evaluation values and supplies the collected waveform data to the image recording unit 30. These plurality of evaluation values are values which are varied according to the state of the subject W. Such a state of the subject W is the position, the orientation, the brightness, the size, the shape, the colors, or the like of the subject W.

An evaluation value is an average luminance value of the image of each frame including the subject W picked up by the camera 2 (an average luminance value over a plurality of pixels constituting the image of each frame), for example. In this case, the waveform collection unit 60 successively calculates average luminance values of the images of the respective frames, as evaluation values, based on the image data of the respective frames having been successively supplied from the camera 2 to the image recording unit 30. The plurality of successively-calculated average luminance values are stored, as waveform data, in the waveform-data storage area in the image recording unit 30. In this case, the plurality of evaluation values can be obtained, in synchronization with the image data of the plurality of frames. Accordingly, the number of a plurality of evaluation values per unit time is equal to the number of image data of a plurality of frames per unit time. An evaluation value may be either the total sum of luminance values of the image of the each frame, the difference between the total sum of luminance values of the image of the each frame and the total sum of luminance values of the image of the subsequent frame, or dispersion of luminance values in the each frame. An evaluation value may be either the total sum of luminance values of a plurality of pixels constituting the image of the each frame, the difference between the total sum of luminance values of the image of the each frame and the total sum of luminance values of the image of the subsequent frame, or a dispersion of luminance values in the each frame.

The waveform collection unit 60 may be adapted to acquire, as evaluation values, the values of output signals from the sensor 6, during acquisition of image data of a plurality of frames. In this case, a plurality of evaluation values can be acquired with the same period as that of image data of the plurality of frames or a different period therefrom. Accordingly, the number of a plurality of evaluation values per unit time does not always agree with the number of image data of a plurality of frames per unit time. In cases where a plurality of evaluation values are acquired with a period shorter than that of image data of a plurality of frames, more than one evaluation value are associated with image data of each frame. In cases where a plurality of evaluation values are acquired with a period longer than that of image data of a plurality of frames, each evaluation value is associated with image data of more than one frame.

In cases where the sensor 6 is a temperature sensor, a distance sensor, a pressure sensor, an acceleration sensor, a displacement sensor, or the like, the waveform collection unit 60 successively acquires, as evaluation values, measured values of the temperature, the distance, the pressure, the acceleration, the displacement, or the like of a to-be-measured object, and the acquired plurality of evaluation values are stored, as waveform data, in the waveform-data storage area of the image recording unit 30.

Further, in cases of employing a microphone, in place of the sensor 6, the waveform collection unit 60 successively acquires sound signals, as evaluation values, and the acquired plurality of sound signals are stored, as waveform data, in the waveform-data storage area of the image recording unit 30.

Further, referring to FIG. 1, the waveform collection device 7 connected to the image processing device 1 has the same structure as that of the waveform collection unit 60. Therefore, in cases where the waveform collection device 7 is connected to the image processing device 1, the waveform collection device 7 successively acquires, as evaluation values, the values of output signals from the sensor 8, and the acquired plurality of evaluation values are stored, as waveform data, in the waveform-data storage area of the image recording unit 30.

The control unit 10 is constituted by, for example, a CPU (Central Processing Unit), a ROM (Read Only Memory), a RAM, and a timer. The CPU in the control unit 10 controls the operations of the camera 2, the illumination device 3, and the other components in the image processing device 1, based on user's operations on the operation unit 4. Further, the CPU in the control unit 10 executes, in the RAM, the image processing program stored in the storage unit 40. The ROM stores a system program.

(2) Basic Operations of Image Processing System

There will be described basic operations of the image processing system 100 in FIG. 1.

(2-1) Setting of Image-Pickup Conditions

Figure 2:
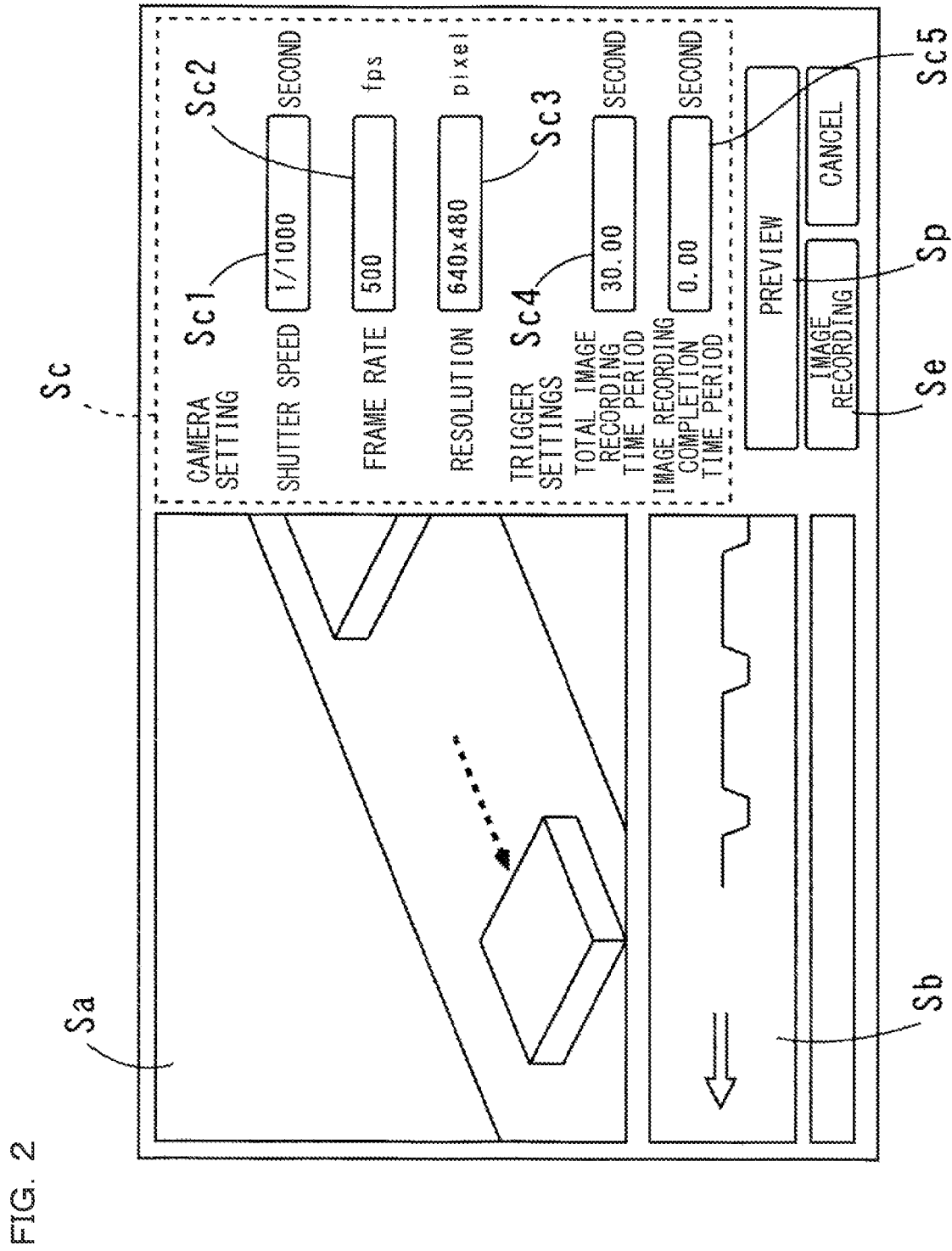
FIG. 2 is a view illustrating an exemplary display on a display unit at the time of setting image-pickup conditions.

The user sets image-pickup conditions of the camera 2, by operating the operation unit 4. FIG. 2 is a view illustrating an exemplary display on the display unit 20 at the time of setting the image-pickup conditions. As illustrated in FIG. 2, at the time of setting the image-pickup conditions, an image display area Sa, a waveform display area Sb, a condition setting area Sc, a preview button Sp, and an image recording button Se are displayed on the display unit 20.

In the image display area Sa, images based on image data stored in the video memory 50 are displayed. In the waveform display area Sb, a graph of a waveform based on waveform data collected by the waveform collection unit 60 is displayed. The horizontal axis of the waveform graph represents time, while the vertical axis represents the evaluation values. For example, in cases where the evaluation values are average luminance values of the images displayed in the image display area Sa, a graph of a waveform is displayed in the waveform display area Sb, with the vertical axis representing the average luminance values of the images and with the horizontal axis representing the time.

In the condition setting area Sc, basic image-pickup conditions of the camera 2 are displayed. A plurality of input frames Sc1, Sc2, and Sc3 for setting image-pickup conditions are displayed therein, wherein these image-pickup conditions are the shutter speed, the image-pickup frame rate, and the resolution, for example. The user inputs respective values of the shutter speed, the image-pickup frame rate, and the resolution, in the input frames Sc1, Sc2, and Sc3, using the operation unit 4. Based on the respective values inputted in the input frames Sc1, Sc2, and Sc3, the control unit 10 sets the shutter speed, the image-pickup frame rate, and the resolution of the camera 2.

Further, in the present embodiment, it is possible to supply, to the control unit 10, a trigger signal which forms a reference for the timing of completion of an image recording process, which will be described later, according to user's operations on the operation unit 4, for example. In the condition setting area Sc, input frames Sc4 and Sc5 for making trigger settings for the control unit 10 based on such a trigger signal are further displayed.

The user inputs, in the input frames Sc4 and Sc5, values of a total image-recording time period and an image-recording completion time period which will be described later, respectively, using the operation unit 4. Based on the respective values inputted in the input frames Sc4 and Sc5, the control unit 10 performs trigger settings. The trigger settings will be described in detail.

In the present embodiment, the trigger settings refers to defining the storage time period over which image data is to be stored in the image recording unit 30 through a single image-recording process (hereinafter, referred to as "total image-recording time period"), and further, defining the time period from the time point at which a trigger signal is supplied to the control unit 10 until the completion of the image-recording process (hereinafter, referred to as "image-recording completion time period").

For example, in cases of making the trigger settings by setting the total image-recording time period to 30 seconds and by setting the image-recording completion time period to 0 second, an image recording process is completed at the time point at which a trigger signal is supplied to the control unit 10, after the start of the image recording. Thus, moving-image data and waveform data acquired within the time interval from 30 seconds before the time point of the supply of the trigger signal to the control unit 10 to the time point of the supply of the trigger signal thereto are stored in the image recording unit 30.

On the other hand, in cases of making the trigger settings by setting the total image-recording time period to 30 seconds and by setting the image-recording completion time period to 30 seconds, an image-recording process is completed at the time point at which 30 seconds has elapsed since the time point of the supply of the trigger signal to the control unit 10, after the start of the image recording. Thus, moving-image data and waveform data acquired within the time interval from the time point of the supply of the trigger signal to the control unit 10 until the elapse of 30 seconds since then are stored in the image recording unit 30.

Further, in cases of making trigger settings by setting the total image-recording time period to 30 seconds and by setting the image-recording completion time period to 15 seconds, an image-recording process is completed at the time point at which 15 seconds has elapsed since the time point of the supply of the trigger signal to the control unit 10. Thus, moving-image data and waveform data acquired within the time interval from 15 seconds before the time point of the supply of the trigger signal to the control unit 10 until the elapse of 30 seconds since then are stored in the image recording unit 30.

Further, instead of setting the aforementioned total image-recording time period, as a trigger setting, the total number of frames of image data to be stored in the image recording unit 30 through an image recording process can be set. Further, instead of setting the aforementioned image-recording completion time period, as a trigger setting, the number of frames of image data to be stored in the image recording unit 30 after the time point of supply of a trigger signal can be set.

Also, the PLC 5 may be adapted to supply trigger signals to the control unit 10. In this case, for example, trigger signals can be supplied to the control unit 10, with a period which has been preliminarily set in the PLC 5 or in response to timings of certain operations of an external apparatus connected to the PLC 5. Also, output signals from various types of sensors can be supplied, as trigger signals, to the control unit 10.

If the user selects the preview button Sp using the operation unit 4, the control unit 10 performs a preview moving-image reproduction process. In this case, a preview moving image is displayed on the display unit 20. The user can make settings of various types of image-pickup conditions, by referring to the preview moving image. The preview moving-image reproduction process will be described below in detail.

If the user selects the image recording button Se using the operation unit 4, the control unit 10 starts an image recording process.

(2-2) Image Recording Process

Figure 3A:
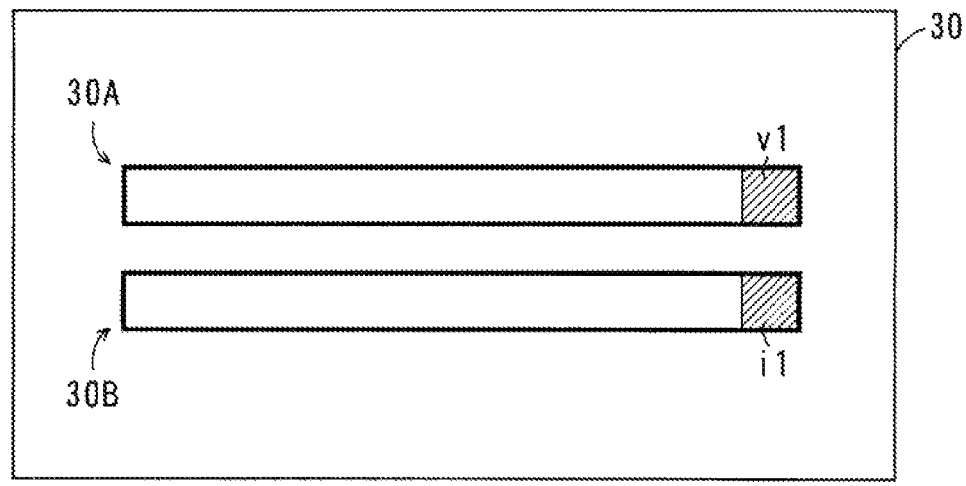
FIGS. 3A to 3C are schematic views illustrating storage states of an image recording unit in FIG. 1, during an image recording process.
Figure 3B:
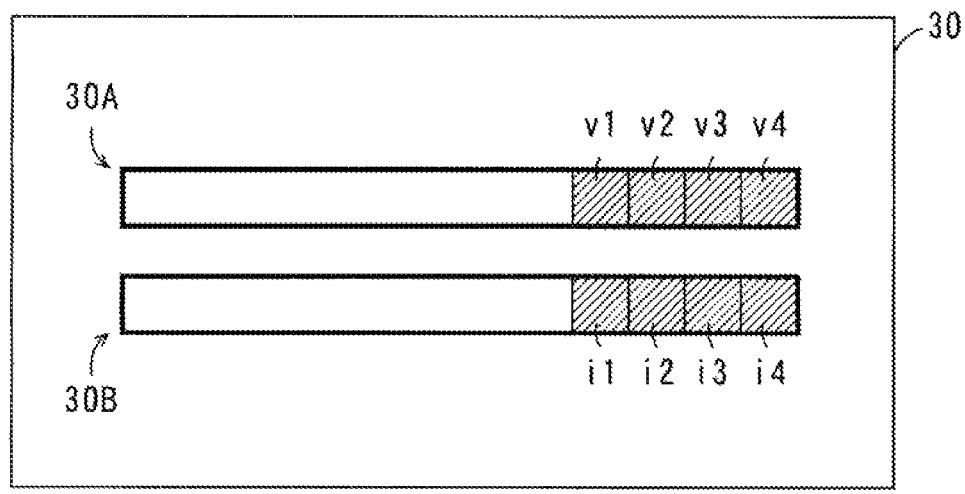
Figure 3C:
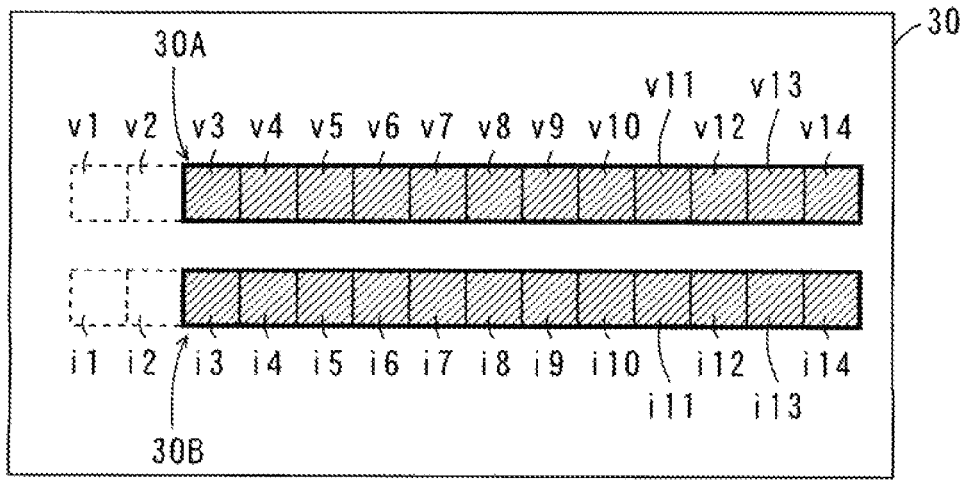

FIGS. 3A to 3C are schematic views illustrating storage states of the image recording unit 30 in FIG. 1, during an image recording process. As described above, the image recording unit 30 is provided with a moving-image data storage area 30A for storing moving-image data (image data of a plurality of frames), and a waveform-data storage area 30B for storing waveform data (a plurality of evaluation values).

In the image processing device 1, as illustrated in FIG. 3A, if the image-recording button Se in FIG. 2 is operated, the control unit 10 starts an image recording process. In the image recording process, image data v1 corresponding to an image of a first frame supplied from the camera 2 is stored in the moving-image data storage area 30A in the image recording unit 30. Further, a first evaluation value i1 supplied from the waveform collection unit 60 is stored in the waveform-data storage area 30B in the image recording unit 30.

Subsequently, as illustrated in FIG. 3B, image data v2, v3, and v4 corresponding to images of second, third, and fourth frames supplied from the camera 2 are stored, in order, in the moving-image data storage area 30A in the image recording unit 30, and further, the image data v1, v2, v3, and v4 shift, in order, in the moving-image data storage area 30A. At the same time, second, third, and fourth evaluation values i2, i3, and i4 supplied from the waveform collection unit 60 are stored, in order, in the waveform-data storage area 30B in the image recording unit 30, and also, these evaluation values i1, i2, i3, and i4 shift in order in the waveform-data storage area 30B.

If the amount of image data stored in the moving-image data storage area 30A exceeds the storage capacity of the moving-image data storage area 30A during the image recording process, the image data of the oldest frame stored in the moving-image data storage area 30A is eliminated, every time image data of a most recent frame (current frame) is newly stored in the moving-image data storage area 30A.

Similarly, if the amount of evaluation values stored in the waveform-data storage area 30B exceeds the storage capacity of the waveform-data storage area 30B during the image recording process, the oldest evaluation value stored in the waveform-data storage area 30B is eliminated, every time a most recent evaluation value is newly stored in the waveform-data storage area 30B.

In the example of FIG. 3C, in a state where twelve pieces of image data v1 to v12 are stored in the moving-image storage area 30A, two pieces of image data v13 and v14 are further stored, in order, therein and, therefore, the oldest image data v1 and v2 are eliminated therefrom, in order. Further, in a state where twelve evaluation values i1 to i12 are stored in the waveform-data storage area 30B, two image evaluation values i13 and i14 are stored in order therein and, thus, the oldest evaluation values i1 and i2 are eliminated therefrom, in order. As a result thereof, the image data v3 to v14 are stored in the moving-image data storage area 30A, and the evaluation values i3 to i14 are stored in the waveform-data storage area 30B.

As described above, during image recording processes, moving-image data and waveform data are successively stored in a so-called ring buffer format, in the moving-image data storage area 30A and the waveform-data storage area 30B.

In the example of FIG. 3C, the evaluation values i3 to i14 stored in the waveform-data storage area 30B are in one-to-one correspondence with the image data v3 to v14 stored in the moving-image data storage area 30A. In cases where a plurality of evaluation values are acquired with a different period from that of image data of a plurality of frames, as described above, the evaluation values stored in the waveform-data storage area 30B are not in one-to-one correspondence with the image data stored in the moving-image data storage area 30A.

Figure 4:
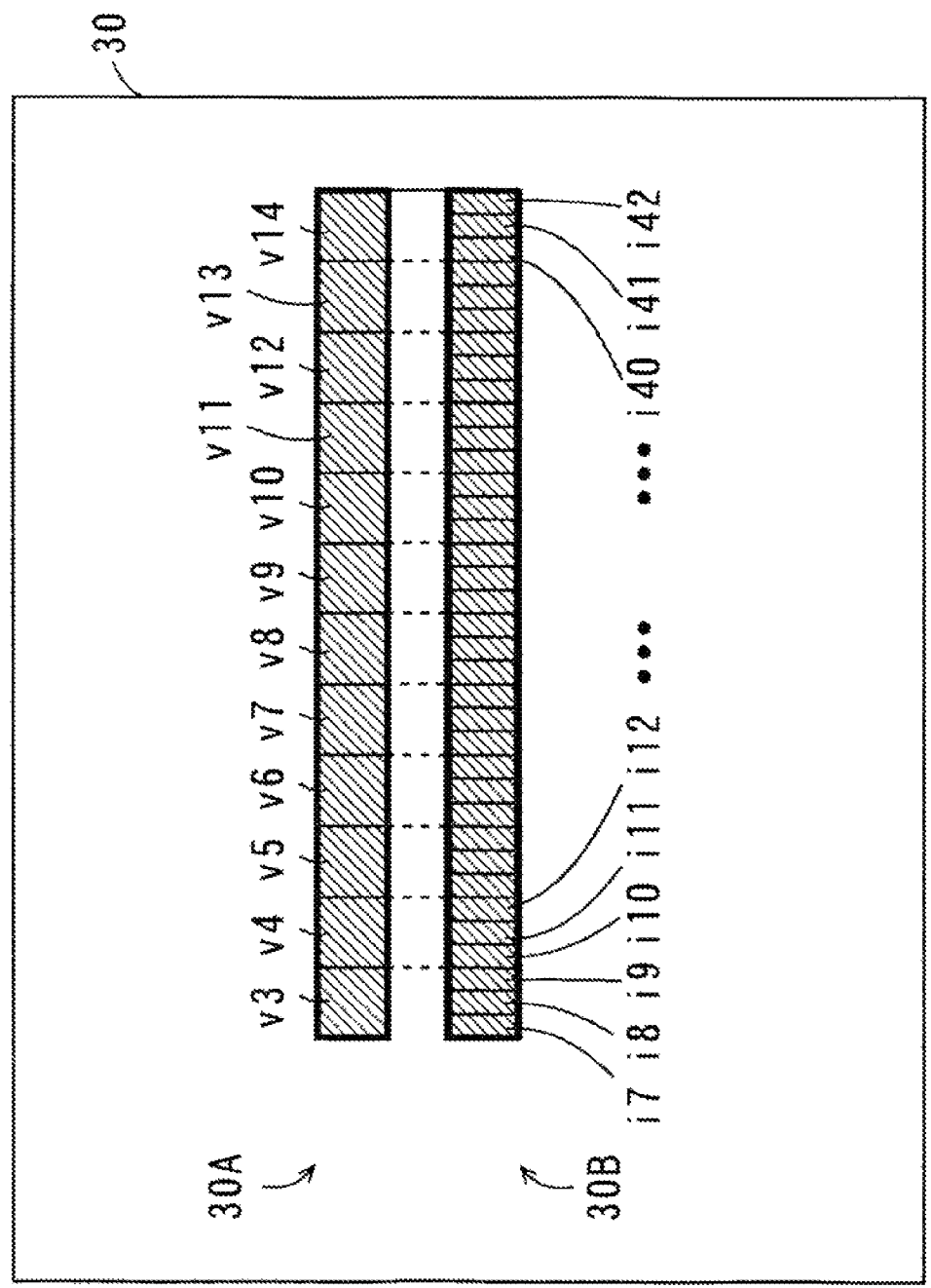
FIG. 4 is a schematic view illustrating another exemplary storage state of the image recording unit in FIG. 1, during the image recording process.

FIG. 4 is a schematic view illustrating another exemplary storage state of the image recording unit 30 in FIG. 1, during an image recording process. In the example of FIG. 4, a plurality of evaluation values are acquired with a shorter period than that of image data of a plurality of frames. Therefore, the evaluation values i7 to i42 stored in the waveform-data storage area 30B are not in one-to-one correspondence with the image data v3 to v14 stored in the moving-image data storage area 30A. Continuous three evaluation values correspond to image data of a single frame. For example, the evaluation values i7, i8, and i9 correspond to the image data v3, and the evaluation values i10, i11, and i12 correspond to the image data v4.

In cases where a plurality of evaluation values are acquired with a longer period than that of image data of a plurality of frames, each evaluation value corresponds to image data of a plurality of frames.

Figure 5:
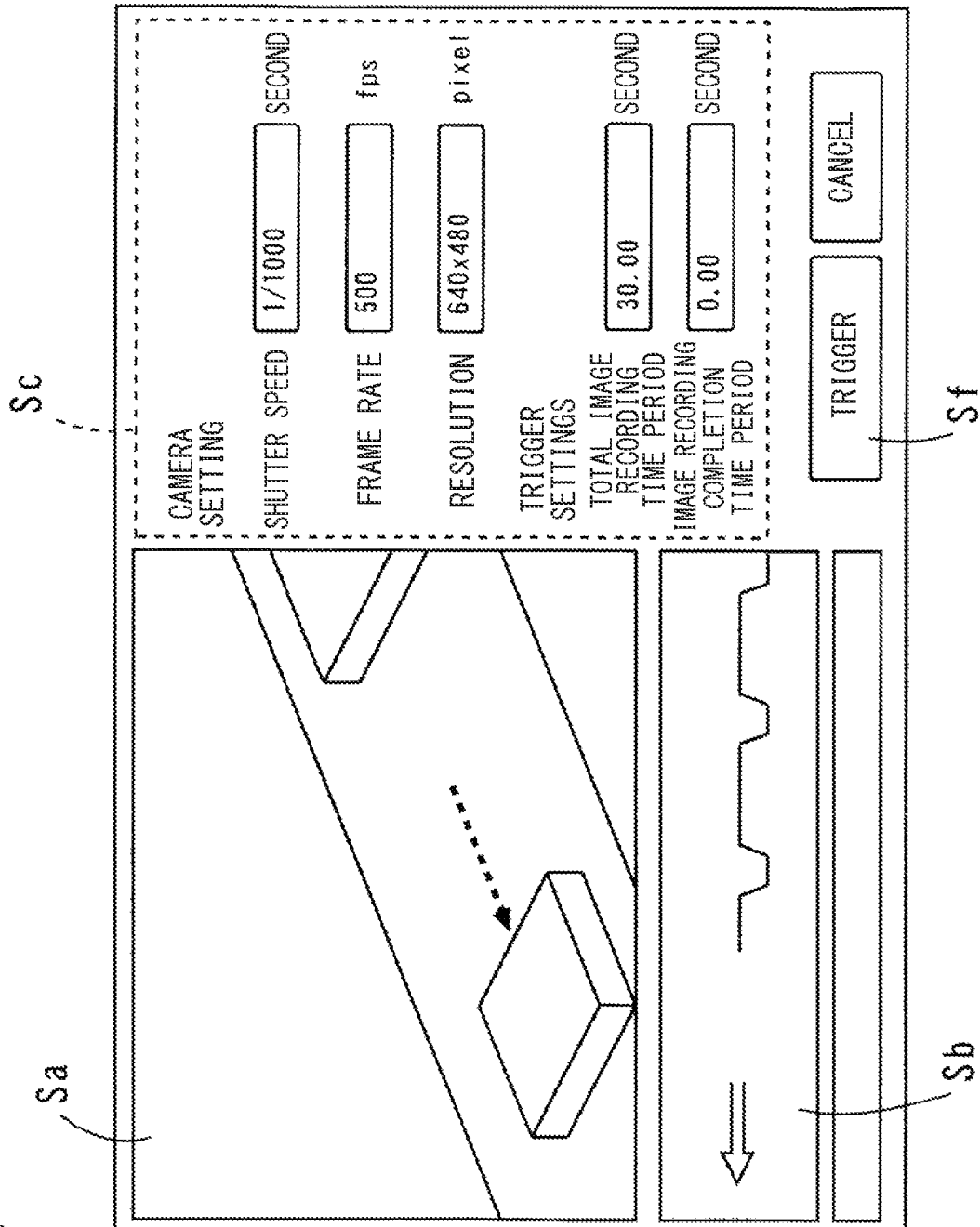
FIG. 5 is a view illustrating an exemplary display on the display unit during the image recording process.

FIG. 5 is a view illustrating an exemplary display on the display unit 20 during an image recording process. As illustrated in FIG. 5, a trigger button Sf is displayed on the display unit 20, instead of the image-recording button Se in FIG. 2, during the image-recording process.

If the user selects the trigger button Sf by using the operation unit 4, a trigger signal is supplied to the control unit 10. As described above, this causes the image recording process to be completed at timing based on the trigger settings.

(2-3) File Storage Process

Figure 6:
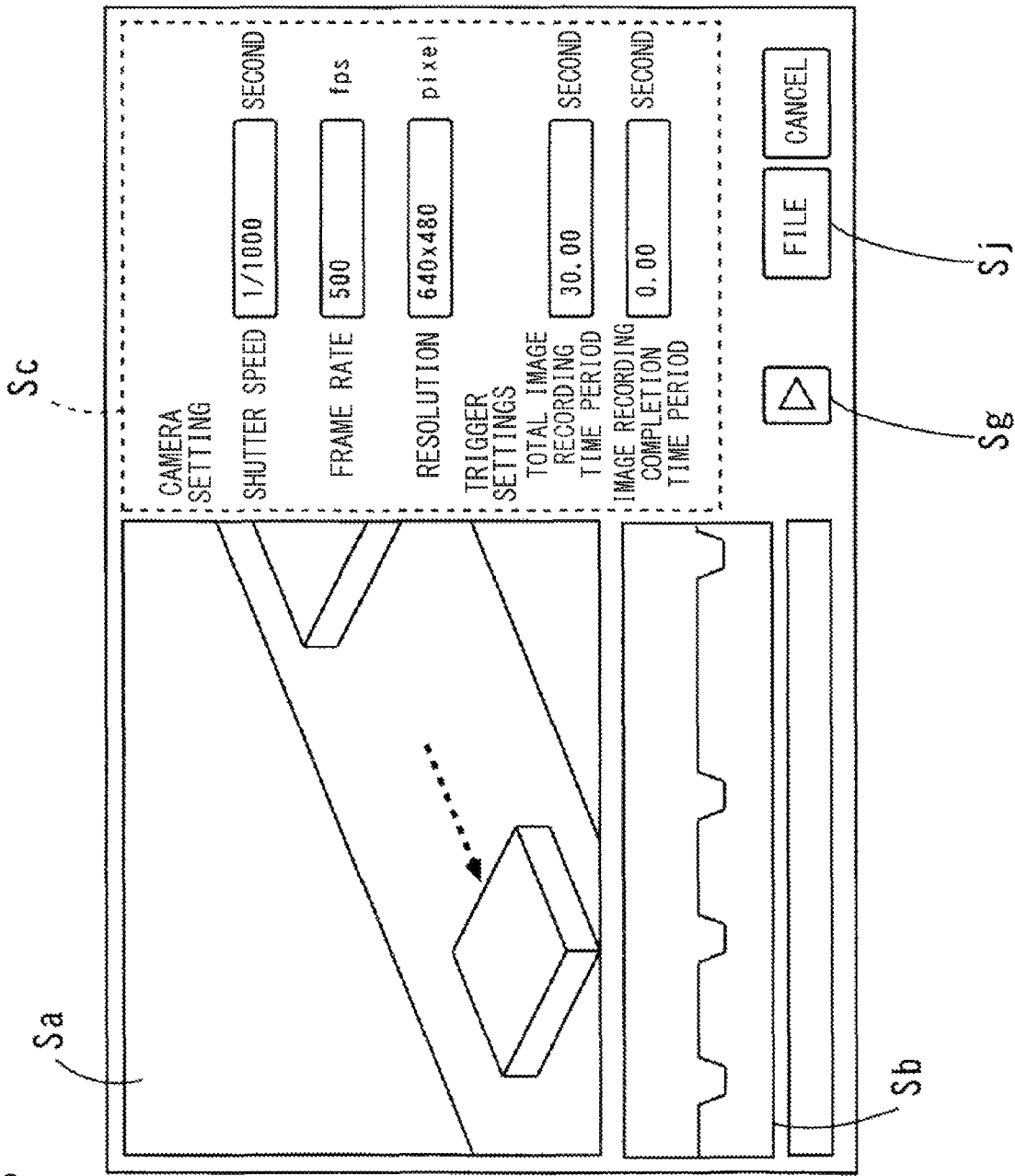
FIG. 6 is a view illustrating an exemplary display on the display unit when the image recording process has been completed.

FIG. 6 is a view illustrating an exemplary display on the display unit 20 when an image recording process has been completed. As illustrated in FIG. 6, when the image recording process has been completed, a file button Sj and a reproduction button Sg are displayed on the display unit 20, instead of the trigger button Sf in FIG. 5.

If the user selects the file button Sj using the operation unit 4, the control unit 10 performs a file storage process. In the file storage process, a moving-image file containing moving-image data and waveform data stored in the image recording unit 30 is created, and the created moving-image file is stored in the storage unit 40 in FIG. 1.

If the user selects the reproduction button Sg using the operation unit 4, the control unit 10 performs a normal reproduction process, as will be described later.

(2-4) Normal Reproduction Process

When one or more moving-image files are stored in the storage unit 40, icons corresponding to the one or more moving-image files are displayed on the display unit 20. If the user selects a single icon being displayed on the display unit 20 using the operation unit 4, the control unit 10 starts a normal reproduction process. Further, when an image recording process has been completed, if the user selects the reproduction button Sg in FIG. 6 using the operation unit 4, the control unit 10 starts a normal reproduction process. Successively displaying images of a continuous plurality of frames on the display unit 20 based on image data of a continuous plurality of frames is referred to as normal reproduction of a moving image.

Figure 7:
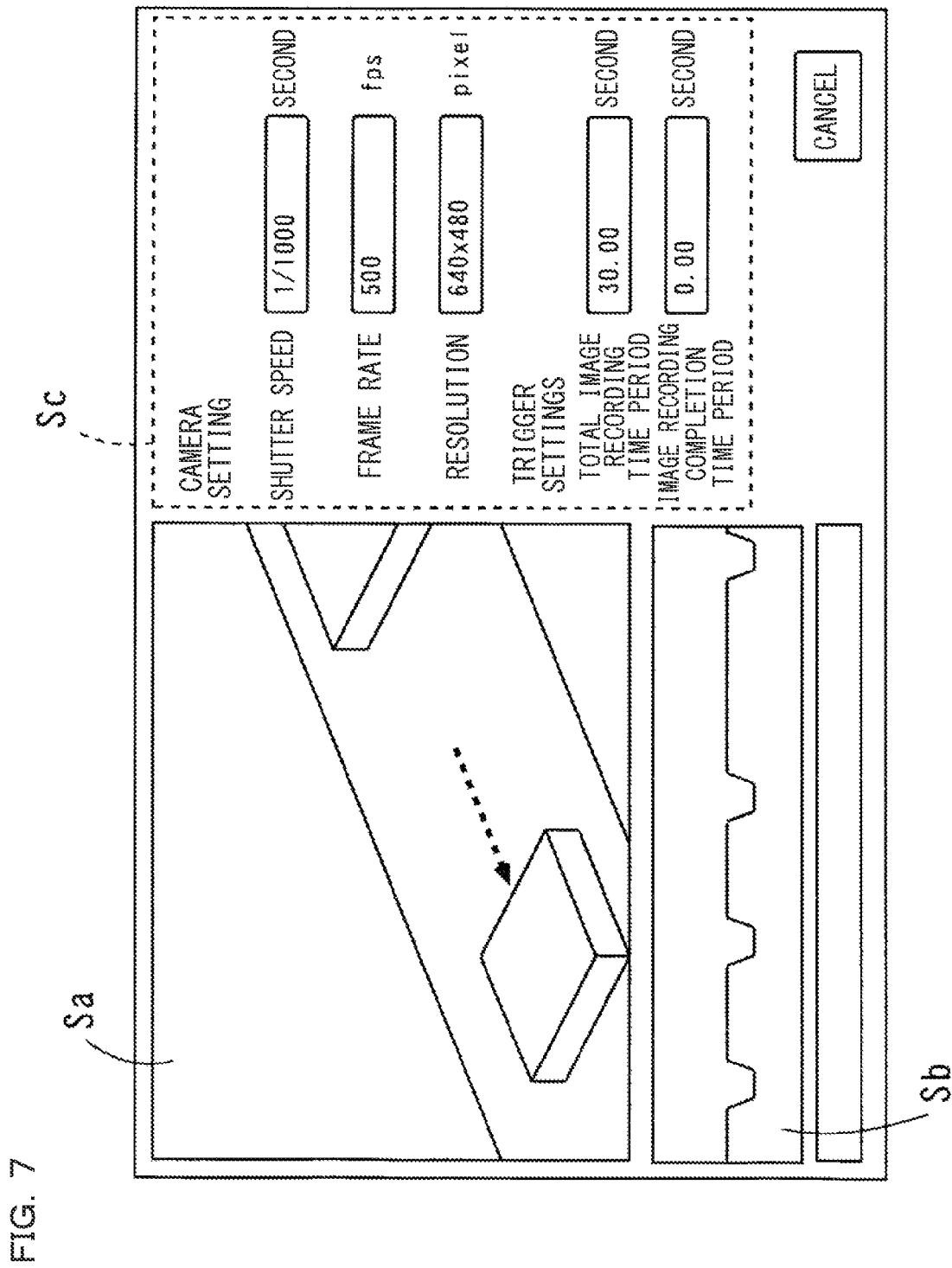
FIG. 7 is a view illustrating an exemplary display on the display unit during a normal reproduction process.

FIG. 7 is a view illustrating an exemplary display on the display unit 20, during a normal reproduction process. As illustrated in FIG. 7, during the normal reproduction process, the image display area Sa, the waveform display area Sb, and the condition setting area Sc are displayed on the display unit 20.

If an icon corresponding to a moving-image file stored in the storage unit 40 is selected, the control unit 10 successively stores, into the video memory 50, the image data of the plurality of frames in the selected moving-image file in the storage unit 40. Thus, images based on the image data having been successively stored in the video memory 50 are displayed in the image display area Sa. Thus, a moving image is normally reproduced, based on the image data of the plurality of frames in the selected moving-image file. Further, the control unit 10 stores, into the video memory 50, the waveform data in the selected moving-image file in the storage unit 40. Thus, a graph of a waveform based on the waveform data is displayed in the waveform display area Sb.

If the reproduction button Sg in FIG. 6 is selected when an image recording process has been completed, the control unit 10 successively stores, into the video memory 50, the image data of the plurality of frames in the image recording unit 30. Thus, continuous images based on the image data having been successively stored in the video memory 50 are displayed in the image display area Sa in FIG. 7. Thus, a moving image is normally reproduced, based on the image data of the plurality of frames stored in the image recording unit 30. Further, the control unit 10 stores, into the video memory 50, the waveform data stored in the image recording unit 30. Thus, a graph of a waveform based on the waveform data is displayed in the waveform display area Sb in FIG. 7.

(3) Preview Moving-Image Reproduction Process

Figure 8:
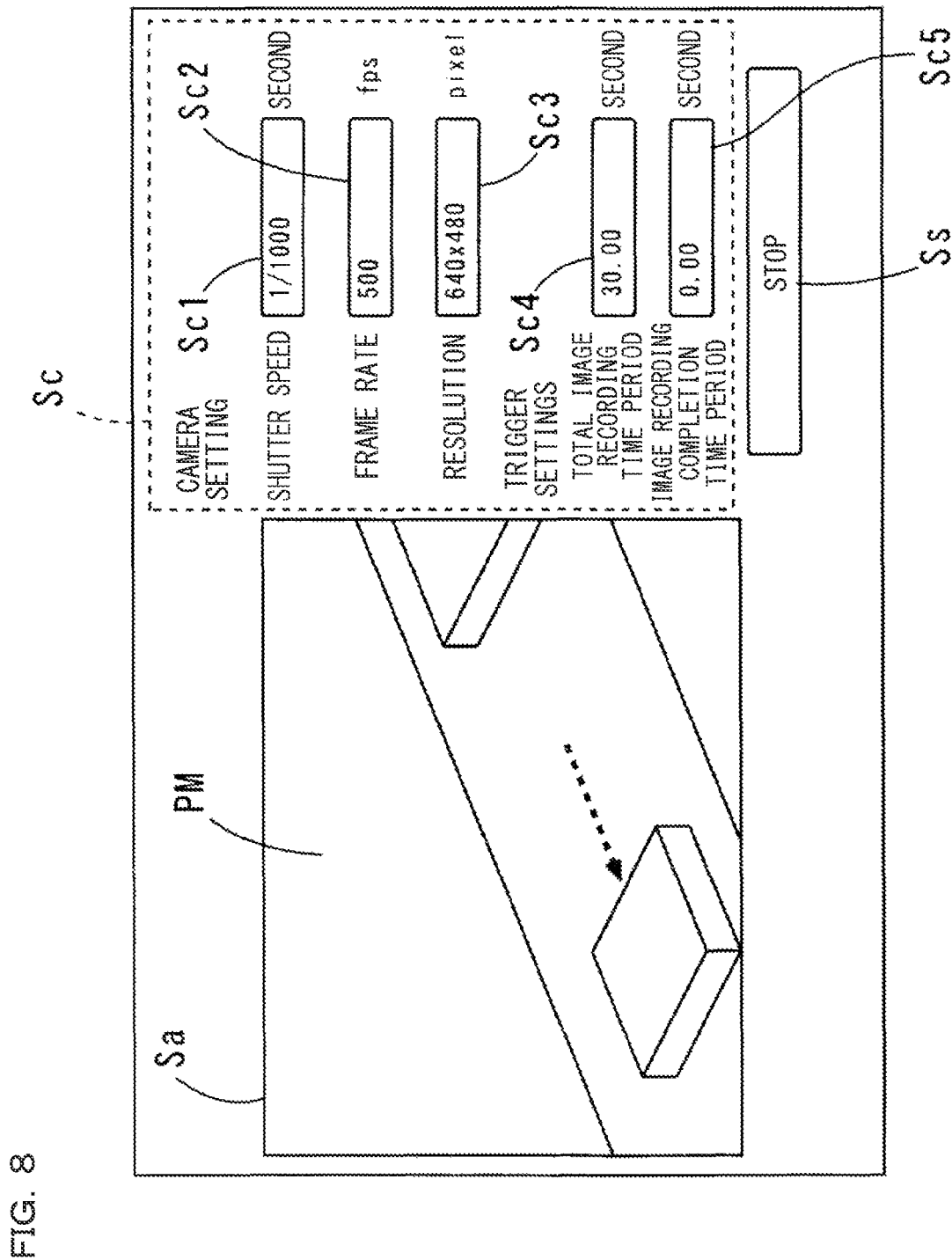
FIG. 8 is a view illustrating an exemplary display on the display unit during a preview moving-image reproduction process.

If the preview button Sp in FIG. 2 is selected, the control unit 10 performs a preview moving-image reproduction process which will be described later. FIG. 8 is a view illustrating an exemplary display on the display unit 20 during a preview moving-image reproduction process. As illustrated in FIG. 8, the image display area Sa, the condition setting area Sc, and a stop button Ss are displayed on the display unit 20. A preview moving image PM is displayed in the image display area Sa.

Figure 9:
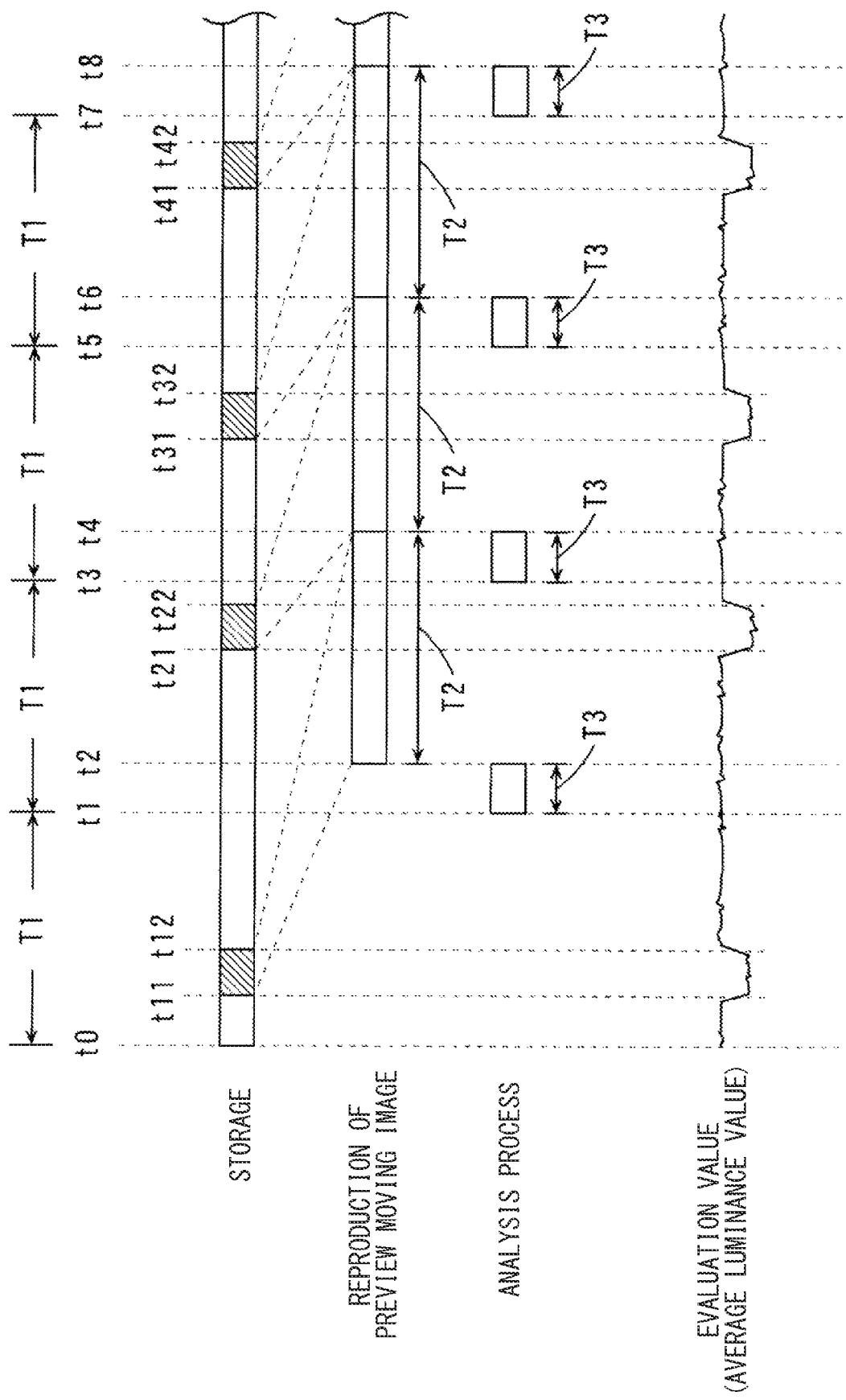
FIG. 9 is a timing chart illustrating timings of recording of image data and displaying of a preview moving image, during a preview moving-image reproduction process.

FIG. 9 is a timing chart illustrating timings of recording of image data and displaying of a preview moving image, during a preview moving-image reproduction process.

In the example of FIG. 9, at a time point t0, the user selects the preview button Sp on the display unit 20 using the operation unit 4. Thus, image data of a plurality of frames supplied from the camera 2 are successively stored in the moving-image data storage area 30A in the image recording unit 30. Further, a plurality of evaluation values supplied from the waveform collection unit 60 are successively stored in the waveform-data storage area 30B in the image recording unit 30. The storage state of the image recording unit 30 during the preview moving-image reproduction process is the same as the storage state of the image recording unit 30 during the aforementioned image recording process.

Within the time interval from a time point t1 after the elapse of a defined time period T1 since the time point t0 to a time point t2, the control unit 10 performs an analysis process. As the analysis process, the control unit 10 acquires, from the waveform-data storage area 30B in the image recording unit 30, the evaluation values corresponding to the image data of the plurality of frames stored within the time interval from the time point t0 to the time point t1. Based on the acquired evaluation values, the control unit 10 selects a group of reproduction data formed from image data of a certain number of frames, out of the image data of the plurality of frames stored within the time interval from the time point t0 to the time point t1.

In this case, the control unit 10 selects image data of a certain number of continuous frames, as a group of reproduction data, by using, as a reference, image data corresponding to an evaluation value indicating a predetermined characteristic. In the present example, each evaluation value is an average luminance value. The control unit 10 acquires average luminance values of the images of the respective frames stored within the time interval from the time point t0 to the time point t1. The control unit 10 selects, as a group of reproduction data, image data in a single section which have smallest average luminance values, within the time interval from the time point t0 to the time point t1. Such a single section is a section including a certain number of frames.

In the present example, images captured at the time the subject W (work) passed through the area subjected to image pickup by the camera 2 (hereinafter, referred to as "image-pickup area") have smaller average luminance values. Therefore, image data in a single section which have been stored at the time of the passage of the subject W through the image-pickup area are determined as a group of reproduction data.

FIG. 9 illustrates, in a lower stage, the variation in the average luminance values as the evaluation values. In this case, there is a smaller amount of variations in the average luminance values corresponding to the image data in a single section which have been acquired within the time interval from a time point t11 to a time point t12. Therefore, image data in the single section which have been acquired within the time interval from the time point t11 to the time point t12 are determined as a group of reproduction data.

Further, it is preferable to select, as a group of reproduction data, image data in a single section within which there are larger movements of the subject W between frames or there are larger variations in image data between frames. In this case, it is possible to employ, as each evaluation value, the total sum of the absolute values of the differences in luminance value between all the pixels of the image of the corresponding frame and all the pixels of the image of the previous frame, or a time-differentiated value of an average luminance value of the image of the corresponding frame.

After the completion of the analysis process at the time point t2, the control unit 10 starts reproduction of a moving image based on the group of reproduction data determined through the analysis process. In this case, the group of reproduction data is successively stored in the video memory 50, and based on the group of reproduction data, images of a plurality of frames are successively displayed, as a preview moving image, on the display unit 20.

During the preview moving-image reproduction process, the reproduction frame rate is lower than the image-pickup frame rate and, for example, in the range of not less than 1 fps and not more than 60 fps. In this case, the reproduction frame rate refers to the number of frames of images which are displayed on the display unit 2 per unit time. In the present example, the reproduction frame rate and the number of frames in a group of reproduction data are determined, such that a time period T2 within which the group of reproduction data is reproduced is equal to the defined time period T1. In cases where the reproduction frame rate is 1/M the image-pickup frame rate, the number of frames in a group of reproduction data is 1/M the number of frames of image data stored within the defined time period T1. In this case, M is a real number larger than 1.

Subsequently, within the time interval from a time point t3 after the elapse of another defined time period T1 since the time point t1 to a time point t4, the control unit 10 performs the same analysis process as the aforementioned analysis process. In this case, image data of a plurality of frames stored within the time interval from a time point t21 to a time point t22, out of the image data of the plurality of frames stored within the time interval from the time point t1 to the time point t3, are determined as a group of reproduction data. After the completion of the analysis process at the time point t4, the control unit 10 starts reproduction of a moving image based on the group of reproduction data determined through the analysis process.

In this case, a time period T3 required for a single analysis process by the control unit 10 is constant. Further, as described above, the time period T2 within which a group of reproduction data is reproduced is equal to the period with which the control unit 10 performs analysis processes (the time period T1). Thus, at the same time as the completion of the analysis process at the time point t4, the reproduction of the moving image started at the time point t2 is completed. Accordingly, the moving image based on the group of reproduction data stored from the time point t11 to the time point t12 and the moving image based on the group of reproduction data stored from the time point t21 to the time point t22 are continuously reproduced.

Thereafter, similarly, after the elapse of every defined time period T1, the control unit 10 performs an analysis process, and further, reproduces a moving image based on a group of reproduction data determined through the analysis process. Thus, moving images based on a plurality of groups of reproduction data are successively displayed, as preview moving images, on the display unit 20. Further, the period of analysis processes can be either defined based on the time as in the present example or defined based on the number of frames therein.

In the present example, the time interval from the time point t0 to the time point t1, the time interval from the time point t1 to the time point t3, the time interval from the time point t3 to the time point t5, and the time interval from the time point t5 to the time point t7 are an example of first time intervals, while the time interval from the time point t2 to the time point t4, the time interval from the time point t4 to the time point t6, and the time interval from the time point t6 to the time point t8 are an example of second time intervals. Further, the number of frames of image data acquired within each defined time interval T1 is an example of a first number of frames, and the number of frames included in a single section is an example of a second number of frames.

Figure 10:
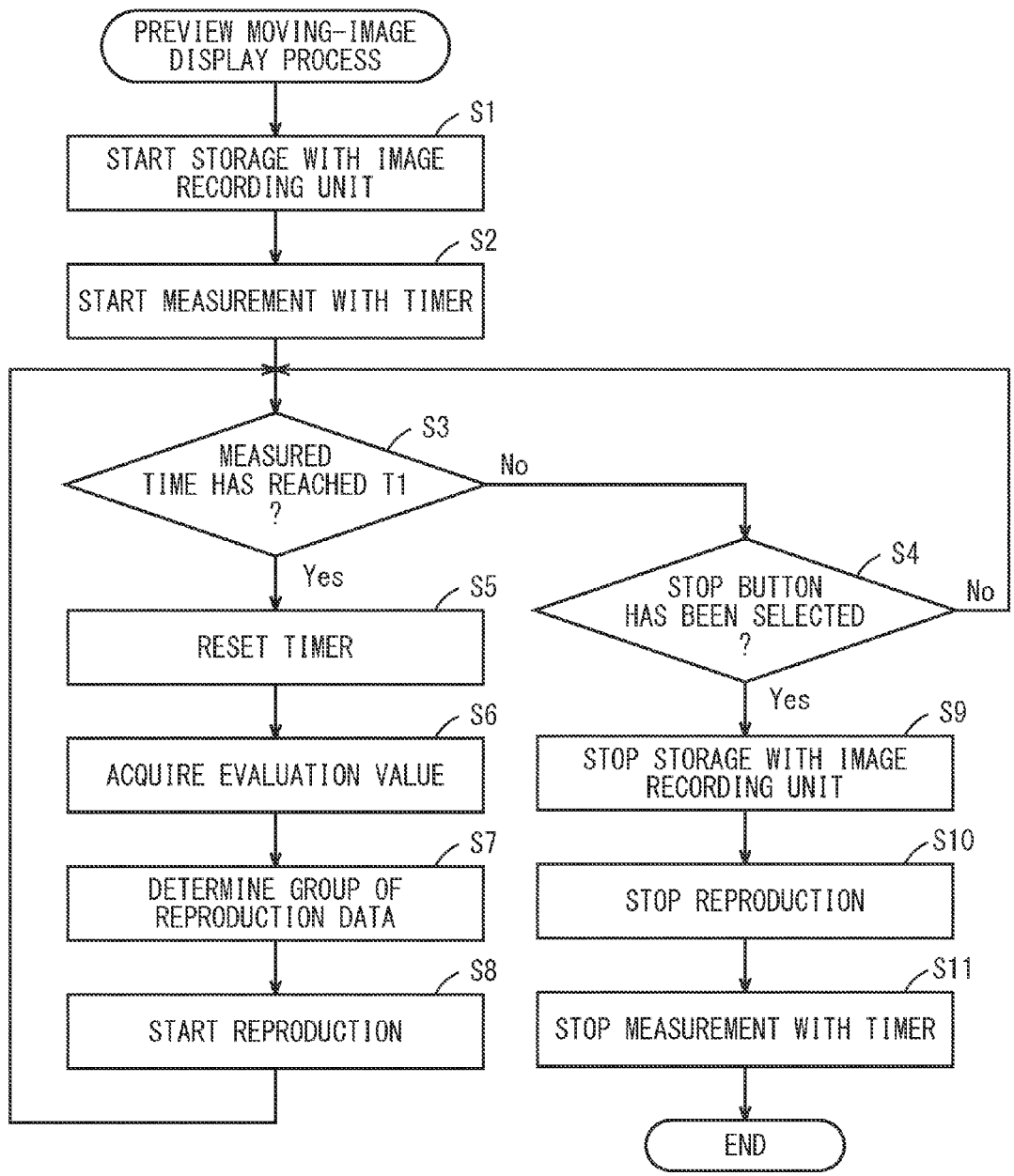
FIG. 10 is a flow chart of a preview moving-image reproduction process by a control unit.

FIG. 10 is a flow chart of a preview moving-image reproduction process by the control unit 10. The preview moving-image reproduction process is performed based on an image processing program stored in the storage unit 40. If the preview button Sp is selected on the screen in FIG. 2, the control unit 10 starts a preview moving-image reproduction process.

At first, the control unit 10 starts storage of image data and evaluation values with the image recording unit 30 (step S1), and also, starts measurement with the timer (step S2). In this case, the time elapsed since the start of the storage of image data and evaluation values with the image recording unit 30 is measured with the timer.

Next, the control unit 10 determines whether or not the time measured by the timer has reached the defined time period T1 (step S3). If the time measured by the timer has not reached the defined time period T1, the control unit 10 determines whether or not the stop button Ss in FIG. 8 has been selected (step S4). If the stop button Ss has not been selected, the control unit 10 returns to the processing in step S3.

If the time measured by the timer has reached the defined time period T1 in step S3, the control unit 10 resets the timer and starts new measurement (step S5). Next, the control unit 10 acquires, from the image recording unit 30, the evaluation values corresponding to the respective image data stored in the image recording unit 30 within the latest defined time period T1 (step S6), and determines a group of reproduction data from the image data of the plurality of frames stored in the image recording unit 30 within the latest defined time period T1, based on the acquired evaluation values (step S7). The processing in steps S6 and S7 correspond to an analysis process.

Next, the control unit 10 starts reproduction of a moving image based on the group of reproduction data (step S8). In this case, the control unit 10 successively stores the group of reproduction data in the video memory 50, such that the moving image based on the group of reproduction data is displayed on the display unit 20 at a predetermined reproduction frame rate. Thereafter, the control unit 10 returns to the processing in step S3.

If the stop button Ss has not been selected in step S4, as described above, the control unit 10 repeats the processing in steps S3 to S8. Thus, after the elapse of every defined time period T1, the control unit 10 performs an analysis process, and further, reproduces a moving image based on a group of reproduction data determined through the analysis process.

If the stop button Ss has been selected in step S4, the control unit 10 stops storing image data and evaluation values with the image recording unit 30 (step S9). Further, the control unit 10 stops the reproduction of the moving image based on the group of reproduction data which was started in step S8 (step S10). Further, the control unit 10 stops the measurement with the timer (step S11). Thus, the preview moving-image reproduction process by the control unit 10 is completed.

(4) Effects of the Present Embodiment

With the image processing device 1 according to the present embodiment, a preview moving image can be displayed on the display unit 20 at the time of setting of image-pickup conditions. In this case, image data of a plurality of frames are successively stored in the image recording unit 30, while, after the elapse of every defined time period T1, a group of reproduction data is selected based on evaluation values, and images based on the selected group of reproduction data are slowly reproduced as a preview moving image.

The evaluation values correspond to the image data stored in the image recording unit 30, and are varied according to the state of the subject W. Therefore, it is possible to select a group of image data corresponding to a desired state of the subject W based on the evaluation values. This enables accurately observing the moving image of the subject W within a time interval within which the subject W is in a desired state. This enables easily and properly adjusting the image-pickup conditions, while observing the moving image of the subject W.

Further, in the present embodiment, the reproduction frame rate and the number of frames in a group of reproduction data are determined, such that the defined time period T1 and the reproduction time period T2 are equal to each other. This enables performing, in parallel, storage of image data with the image recording unit 30 and displaying of images based on groups of reproduction data.

Further, in the present embodiment, average luminance values of images of respective frames are employed, as evaluation values. This enables easily and properly selecting a group of reproduction data corresponding to a desired state of the subject W.

(5) Other Embodiments (5-1)

In the aforementioned embodiment, in a preview moving-image reproduction process, image data in a single section within which the corresponding average luminance values are smallest are selected, as a group of reproduction data, out of the image data of the plurality of frames stored within the latest defined time period T1. However, the present invention is not limited thereto, and groups of reproduction data may be selected according to other methods using average luminance values.

For example, the control unit 10 determines the image data corresponding to an image having an average luminance value which is different by a largest amount from that of the previous image, out of the image data of the plurality of frames stored within the latest defined time period T1. The control unit 10 selects, as a group of reproduction data, image data in a single section, by using the determined image data as a reference. In this case, the control unit 10 may select, as a group of reproduction data, image data in a single section starting from the determined image data. Also, the control unit 10 can select, as a group of reproduction data, image data in a single section ending with the determined image data. Also, the control unit 10 can select, as a group of reproduction data, image data in a single section which includes image data of a plurality of frames before the determined image data and further includes image data of a plurality of frames after the determined image data. Also, the control unit 10 can select, as a group of reproduction data, image data of the number of frames in a single section which were stored a certain time before or after the time point of the storage of the determined image data.

(5-2)

While, in the aforementioned embodiment, during a preview moving-image reproduction process, groups of reproduction data are selected based on evaluation values stored in the waveform-data storage area 30B in the image recording unit 30, the present invention is not limited thereto. The control unit 10 may be adapted to, based on image data stored in the moving-image data storage area 30A in the image recording unit 30, calculate the evaluation values corresponding to the respective image data, and further, select groups of reproduction data based on the calculated evaluation values.

(5-3)

While, in the aforementioned embodiment, average luminance values are employed as evaluation values, it is also possible to employ, as evaluation values, other values indicating characteristics of images of respective frames. For example, it is also possible to employ, as evaluation values, values indicating the degrees of similarity between images of respective frames and a predetermined reference image (hereinafter, referred to as similarity values).

For example, an image captured immediately after the subject (work) W has intruded into the image-pick area is defined as a reference image, and the image data corresponding to this reference image is preliminarily stored. The control unit 10 determines the image data corresponding to an image having a largest value of similarity to the reference image, out of the image data of the plurality of frames acquired within the latest defined time period T1. The control unit 10 selects, as a group of reproduction data, image data in a single section starting from the determined image data. In this case, a moving image for a certain time interval immediately after the intrusion of the subject W into the image-pickup area is displayed on the display unit 20.

Also, the control unit 10 may be adapted to select, as a group of reproduction data, image data in a single section ending with the determined image data. Also, the control unit 10 may be adapted to select, as a group of reproduction data, image data in a single section which include image data of a plurality of frames before the determined image data and image data of a plurality of frames after the determined image data. Also, the control unit 10 may be adapted to select, as a group of reproduction data, image data of the number of frames in a single section which were stored a certain time before or after the time point of the storage of the determined image data.

(5-4)

Measured values of a temperature, a distance, a pressure, an acceleration, a displacement or the like which is detected by the sensor 6 or 8 in FIG. 1 may be used as evaluation values. In this case, similarly to the aforementioned structure, it is possible to select groups of reproduction data according to various types of methods.

(5-5)

The image processing device 1 may be structured to enable the user to arbitrarily adjust the defined time period T1, the reproduction frame rate, and the number of frames in a group of reproduction data. For example, on the screen in FIG. 8, input frames for the defined time period T1, the reproduction frame rate, and the number of frames in a group of reproduction data are displayed. The user can input, therein, respective values of the defined time period T1, the reproduction frame rate, and the number of frames in a group of reproduction data, using the operation unit 4.

In this case, the user can properly adjust the defined time period T1, the reproduction frame rate, and the number of frames in a group of reproduction data, according to the type and the moving speed of the subject W and the like.

(5-6)

In the present embodiment, the control unit 10 performs a preview moving-image reproduction process at the time of setting of image-pickup conditions. However, the present invention is not limited thereto, and a preview moving-image reproduction process may be performed during an image recording process. In this case, the subject W in desired states is displayed as a preview moving image on the display unit 20, during an image recording process. This enables continuously performing an image recording process, while observing a moving image of the subject W.

(6) Correspondence between Respective Components in Claims and Respective Units in Embodiments Hereinafter, there will be described examples of correspondence between respective components in the claims and respective units in the embodiments, but the present invention is not intended to be restricted by the following examples.

In the aforementioned embodiment, the image-pickup frame rate is an example of a first frame rate, the reproduction frame rate is an example of a second frame rate, the display unit 20 is an example of a display unit, the waveform collection units 7 and 60 are an example of an acquisition unit, the control unit 10 is an example of a selection unit and a control unit, and the sensors 6 and 8 are an example of a detection device.

As the respective components in the claims, it is also possible to employ other various types of components having the structures or the functions defined in the claims.

The present invention can be effectively applied to various types of image processes.

What is claimed is:

1. An image processing device for displaying a slow moving image of an object, comprising:

a memory configured to successively store, at a first frame rate, a plurality of images picked up from a high-speed image-pickup device;

a controller configured to calculate an evaluation value representing a state of the object on each of the plurality of images based on the plurality of images, and at first time intervals, to select a subset of the plurality of images to be displayed based on the evaluation value within each of first time intervals; and a display unit configured to successively display, at a second frame rate lower than the first frame rate, the subset of the plurality of images, corresponding to one of the first time intervals, selected by the controller as the slow moving image of the object, and configured to subsequently and successively display, at the second frame rate, the subset of the plurality of images, corresponding to further first time intervals, selected by the controller as the slow moving image of the object.

2. The image processing device according to claim 1, wherein the controller is to select the subset of the plurality of images, by using, as a reference, at least one of the plurality of images corresponding to the evaluation value indicating a predetermined characteristic.

3. The image processing device according to claim 1, wherein the second frame rate and a number of the subset of the plurality of images are determined, such that all of the subset of the plurality of images are successively displayed on the display unit within a second time interval equal to each first time interval.

4. The image processing device according to claim 1, wherein the evaluation value represents change of the state of the object in sequential images of the plurality of images.

5. An image processing method for displaying a slow moving image of an object, comprising:

successively storing in a memory, at a first frame rate, a plurality of images picked up from a high-speed image-pickup device;

calculating an evaluation value representing a state of the object on each of the plurality of images based on the plurality of images, selecting a subset of the plurality of images to be displayed based on the evaluation value within each of first time intervals;

successively displaying on a display unit, at a second frame rate lower than the first frame rate, the selected subset of the plurality of images corresponding to one of the first time intervals as the slow moving image of the object; and subsequently and successively displaying on the display unit, at the second frame rate, the selected subset of the plurality of images corresponding to further first time intervals as the slow moving image of the object.

6. A computer program product comprising a non-transitory computer-readable medium encoded with an image processing program which is executed by a processing device to display a slow moving image of an object, the image processing program for causing the processing device to execute the processes of:

successively storing in a memory, at a first frame rate, a plurality of images picked up from a high-speed image-pickup device;

calculating an evaluation value representing a state of the object on each of the plurality of images based on the plurality of images;

selecting a subset of the plurality of images to be displayed based on the evaluation value within each of first time intervals;

successively displaying on a display unit, at a second frame rate lower than the first frame rate, the selected subset of the plurality of images corresponding to one of the first time intervals as the slow moving image of the object; and subsequently and successively displaying on the display unit, at the second frame rate, the selected subset of the plurality of images corresponding to further first time intervals as the slow moving image of the object.

* * * * *